March 2, 1965     R. F. RASMUSSEN     3,171,334
CONTROL APPARATUS
Filed July 5, 1963

INVENTOR.
ROBERT F. RASMUSSEN
BY
Roger W. Jensen
ATTORNEY

United States Patent Office 3,171,334
Patented Mar. 2, 1965

3,171,334
CONTROL APPARATUS
Robert F. Rasmussen, Brooklyn Center, Minn., assignor to Honeywell Inc., a corporation of Delaware
Filed July 5, 1963, Ser. No. 293,013
11 Claims. (Cl. 92—165)

This invention pertains to hydraulic apparatus and more particularly to hydraulic cylinders. A hydraulic cylinder is generally referred to by those skilled in the art as including an actuator rod and a housing containing the actuator rod.

Hydraulic cylinders must be manufactured with extreme precision to insure adequate performance and minimum leakage. It is also necessary to provide a fine surface finish on the relatively movable parts in order to provide a suitable dynamic seal therebetween. Prior art hydraulic cylinders have met these requirements by utilizing highly sophisticated machining techniques in conjunction with highly specialized assembly techniques. The end result is an acceptable product at an extremely high price level.

The applicant's invention has overcome the necessity for expensive machining and specialized assembling techniques through a unique design of the elements of a hydraulic cylinder. The applicant has provided a unique hydraulic cylinder wherein all the piece parts, except the housing, can be fabricated on automatic screw machines. Furthermore, the parts may be centerless ground or lapped to obtain the desired surface finish in an efficient manner. The dynamic seals are designed such that they may be assembled in a stacked assembly so as to eliminate the necessity of specialized assembly techniques including scarf cuts in the resilient seals (O rings) and backup rings. Stacked assembly of the dynamic seals also minimizes seal damage due to assembly. Furthermore, the dynamic seals on the actuator rod piston are designed so as to substantially eliminate pumping of the resilient seals upon movement of the actuator rod relative to the housing.

A more complete understanding of the invention will become apparent from a study of the accompanying specification and claims in conjunction with the drawing in which:

Figure 1:
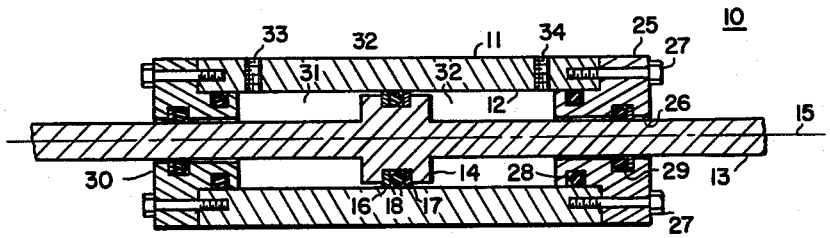
FIGURE 1 illustrates a schematic cross-sectional view of a prior art hydraulic cylinder.

Referring now to FIGURE 1, reference numeral 10 generally defines a prior art hydraulic cylinder. Prior art hydraulic cylinder 10 includes a housing means 11 having a cylindrical bore 12 therethrough. A generally cylindrical actuator rod 13 having an enlarged radius section 14 thereon is positioned within bore 12. Actuator rod 13 is adapted to move relative to housing 11 along an axis 15. Enlarged radius section 14 of actuator rod 13 functions as a piston and has a dynamic seal positioned thereon. The dynamic seal comprises a resilient seal (O ring) 18 located between a pair of backup rings 16 and 17. Backup rings 16 and 17 and seal 18 are positioned within a recess in the periphery of enlarged radius section 14. In order to assemble backup rings 16 and 17 with the recess, it is necessary to sever the backup rings by means of a diagonal scarf cut. O ring 18 is stretched over enlarged radius section 14 and positioned within the recess. However, the O ring is frequently damaged in rolling over the sharp edge of the recess in a stretched condition. The relative movement between actuator rod 13 and housing means 11 causes seal 18 to become abraded at the edges of the scarf cut. This results in contamination of the hydraulic system and loss of a sufficient seal.

Actuator rod 13 is fabricated as a single elongated cylinder. It is difficult and time consuming to maintain close tolerances in machining an elongated cylinder. Furthermore, because of the enlarged radius section 14 on actuator rod 13, it is impossible to grind or lap the element in a centerless manner to obtain the required surface finish. Consequently, it is difficult and time consuming to obtain the surface finish required upon actuator rod 13 to insure an adequate seal.

An annular end cap 25 having a cylindrical opening 26 therein is provided. End cap 25 is circumjacent one end of actuator rod 13 and is rigidly attached to housing means 11 by means of bolts 27. A static seal 28 is provided between end cap 27 and housing means 11, which comprises an O ring positioned with a recess in the periphery of end cap 25. Again it is necessary to stretch the O ring and roll it over the sharp edge of the recess in order to position it within the recess. A dynamic seal 29 is provided between end cap 25 and actuator rod 13. Dynamic seal 29 comprises an O ring and a backup ring positioned within a recess in the inner periphery of end cap 25. In order to assemble the O ring within the recess, it is necessary to fold the O ring into the shape of a figure 8 and allow it to snap into place. In order to assemble the backup ring within the recess it is necessary to sever it by means of a diagonal scarf cut. These assembly techniques are required because the diameter of opening 26 is less than the outer diameter of the backup ring and the O ring utilized in dynamic seal 29.

A second end cap 30 is provided at the opposite end of actuator rod 13 and is identical to end cap 25. Consequently, end cap 30 will not be described in detail.

Housing means 11, in combination with actuator rod 13 and end caps 25 and 30, define a pair of fluid chambers 31 and 32. A passage 33 connects chamber 31 to a control valve (not shown). A passage 34 connects chamber 32 to the control valve. The control valve is effective to connect passages 33 and 34 to a fluid supply (not shown) or to a fluid return (not shown).

In operation, a control valve (not shown) connects passages 33 and 34 to fluid supply and fluid return respectively for a movement of actuator 13 to the right as viewed in FIGURE 1. Thus, a high pressure exists in chamber 31 and a low pressure in chamber 32. The pressure differential acting on the face of enlarged radius section 14 forces actuator rod 13 to the right. The fluid supply and fluid return connections are reversed to obtain movement to the left. Thus, the O rings in dynamic seals 16 and 17 are "pumped" from left to right as actuator rod 13 is displaced from left to right. This results in abrasion of the O rings and failure of dynamic seals 16 and 17. In addition, the relative movement abrades the O rings and dynamic seals 16 and 17 as hereinbefore indicated, resulting in contamination and loss of seal.

Figure 2:
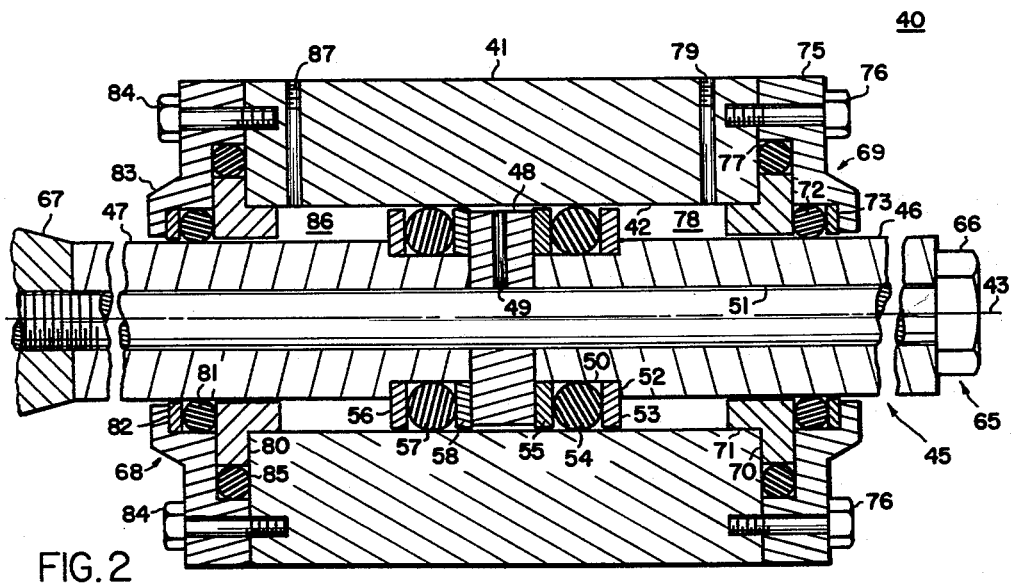
FIGURE 2 illustrates a schematic cross-sectional view of the applicant's unique hydraulic cylinder.

The applicant's invention as illustrated in FIGURE 2 overcomes these disadvantages of the prior art hydraulic cylinder. Reference numeral 40 depicts the applicant's unique hydraulic cylinder. Hydraulic cylinder 40 includes housing means 41 having a cylindrical opening 42 therethrough. The axis of opening 42 is identified by reference numeral 43.

An actuator rod 45 is positioned within opening 42 and is symmetrical with respect to axis 43. Actuator rod 45 generally comprises two identical hollow cylindrical rods 46 and 47 axially positioned on opposite sides of a larger diameter annular piston member 48 and means holding the piston rods on either side of the piston element. More specifically, piston rod 46 comprises a hollow cylindrical shaped element having a reduced diameter section 50 on one end thereof and a cylindrical bore 51 therethrough. It should be pointed out that it is not necessary that bore 51 be cylindrical. The shoulder on piston rod 46 existing between reduced diameter section 50 and the outer periphery of piston rod 46 is identified by reference numeral 52.

An annular piston ring retainer 53 is positioned around the reduced diameter section 50 of piston rod 46 abutting shoulder 52. A resilient piston ring (O ring) 54 is positioned around the reduced diameter section 50 of piston rod 46 adjacent to piston ring retainer 53. An annular backup ring 55 is positioned around the reduced diameter section 50 of piston rod 46 adjacent to O ring 54. Backup ring 55 has an inner diameter slightly larger than the diameter of reduced diameter section 50 of piston rod 46 so that no scarf cut is necessary to assemble it. Backup ring 55 is normally necessary only for high pressure application, that is, pressures exceeding 1500 p.s.i. Piston ring retainer 53, O ring 54, and backup ring 55 cooperate to form a dynamic seal between actuator rod 45 and housing 41. The applicant provides a dynamic seal which may be assembled by a stacking technique, that is, by merely stacking the elements over the reduced diameter section 50 of piston rod 46. No special techniques are necessary to assemble the dynamic seal.

Piston rod 47 is identical to piston rod 46. A piston ring retainer 56, a resilient piston ring 57 (O ring), and a backup ring 58, are positioned upon a reduced diameter section of piston rod 47 so as to form a dynamic seal.

Annular piston member 48 has a radial piston vent hole 49 therein which extends from the outer periphery of piston member 48 to the central opening therein. Piston member 48 is positioned between piston rod 46 and piston rod 47. The end of piston rod 46 having reduced diameter section 50 thereon is positioned adjacent to piston member 48, and the end of piston rod 47 having a reduced diameter section thereon is positioned adjacent the other side of piston member 48.

Means 65 are provided for holding piston rod 46 and piston rod 47 on either side of piston member 48 and concentric with axis 45. In the preferred embodiment, these means comprise a tie bolt 66 positioned through the hollow piston rods and piston member and fastened by a tie bolt nut 67. Nut 67 may be a standard actuator rod end which is directly coupled to suitable linkage means to provide an output. It should be noted that it is not necessary to utilize a tie bolt to connect piston rods 46 and 47 and piston member 48. Various other means are obvious to one skilled in the art. For example, piston rod 46 could be threadably engaged with piston rod 47.

Actuator rod 45 is positioned within bore 42 of housing means 41 such that its axis of symmetry is coaxial with axis 43. There is sufficient clearance between piston member 48 and the periphery of opening 42 so that relative movement may occur between actuator rod 45 and housing means 41.

First end cap means 69 are provided circumjacent actuator rod 45. End cap means 69 includes an annular end cap guide 70 having reduced diameter section 71 thereon which is slightly smaller than the diameter of opening 42. A resilient seal (O ring) 72 is positioned over the end of piston rod 46 and is positioned adjacent to end cap guide means 70. An end cover 75 having a large and small cutaway portion or counter bore is rigidly attached to housing 41 by means of bolts 76. Resilient seal 72 is received within the small cutaway portion of cover 75. A resilient seal 77 is positioned between the outer periphery of end cap guide means 70 and within the large diameter cutaway portion of end cover 75 so as to form a static seal therebetween. Because of the unique design of the applicant's invention, end cap guide means 70, resilient seal 77, resilient seal 72, backup ring 73, and end cover 75 may be assembled solely by a stacking technique without distorting the above seals. That is, end cap means 69 is assembled by merely stacking or sliding the piece parts of the end cap means over piston rod 46. The applicant also provides a dynamic seal which may be quickly and easily assembled with a minimum of assembly damage. In addition, the piece parts may all be fabricated on automatic screw machines.

End cap means 69, actuator rod 45, and housing means 41 cooperate to define the annular fluid chamber 78. Fluid chamber 78 is connected to a suitable control valve (not shown) by means of a passage 79. The control valve functions to switch passage 79 into communication with a fluid supply or a fluid return.

A second end cap means 68 is provided circumjacent actuator rod 45. End cap means 68 includes a second annular end cap guide 80 positioned contiguous the other end of housing 41 and circumscribing piston rod 47. End cap guide 80 is identical to end cap guide 70 and is positioned relative to housing 41 in a like manner. A resilient seal ring 81 is positioned around piston rod 47 adjacent end cap guide 80. A backup ring 82 is positioned around piston rod 47 adjacent seal ring 81. Backup ring 82 is only necessary when utilizing high pressures. An end cover 83, which is identical to end cover 75, is positioned around piston rod 47 and rigidly attached to housing means 41 by means of bolts 84. A resilient seal 85 is positioned around the outer periphery of end cap guide 80 so as to form a static seal between end cap 83 and housing means 41. End cover 83 functions to hold end cap guide 80, ring seal 81, and backup ring 82, in position around piston rod 47 so as to form a dynamic seal between end cap 83 and housing means 41. End cover 83 functions to hold end cap guide 80, ring seal 81, and backup ring 82, in position around piston rod 47 so as to form a dynamic seal between piston rod 47 and end cover 83. The advantages of a stacked assembly procedure is also realized with end cap means 68 and the dynamic seal therein.

End cap means 68, actuator rod 45, and housing means 41, cooperate to form an annular chamber 86. Fluid chamber 86 is connected to the control valve (not shown) through a passage 87. The control valve connects fluid chamber 86 to either a fluid supply or a fluid return.

In operation, the control valve connects passage 87 and chamber 86 to the fluid supply, and connects passage 79 and chamber 78 to the fluid return for movement to the right as viewed in FIGURE 2. The difference in pressure between chambers 86 and 78 results in actuator rod 45 being forced to the right. Piston vent hole 49 is in communication with bore 51 of piston rod 46, and the bore of piston rod 47. Thus, the pressure in piston vent hole 49 is less than the pressure in chambers 86 and 78. This results in piston rings 54 and 57 being continuously forced against backup rings 55 and 58 respectively by the pressure in fluid chambers 78 and 86. That is, the fluid existing within chambers 78 and 86 is effective to apply a pressure to the piston rings 54 and 57 tending to force them toward piston member 48 regardless of the direction movement of the actuator called for by the control valve. This design substantially eliminates the "pumping" of the piston seals 54 and 57. Pumping of the piston seals is inherent in the prior art design illustrated in FIGURE 1. The elimination of the "pumping" of the piston seals results in a more efficient seal and greatly extends the useful life of the seal.

Because of the applicant's unique design of all the piece parts of the hydraulic cylinder, it can be produced on automatic screw machines (with the exception of housing 41). In addition, piston rods 46, 47, may be centerless ground or lapped to obtain the desired surface finish. Further, the hydraulic cylinder may be assembled by means of a stacked technique. That is scarf cuts are not required in the seals, the retainers, or the backup rings in order to assemble the hydraulic cylinder and dynamic seals therein. Also, there is no pumping of the resilient seals of the piston member in the operation of the hydraulic cylinder.

Figure 3:
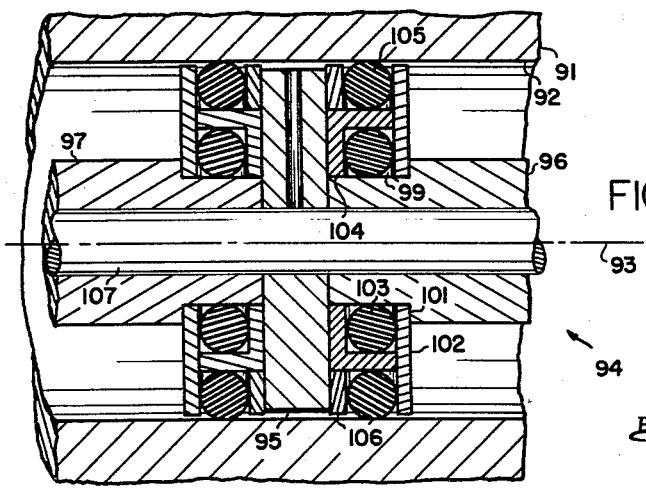
FIGURE 3 discloses a schematic partial cross-sectional view of an alternate embodiment of the applicant's invention.

FIGURE 3 illustrates an alternate embodiment of the applicant's invention adapted for larger area hydraulic cylinders. The hydraulic cylinder illustrated in FIGURE 3 is analogous to the cylinder illustrated in FIGURE 2 with the major difference being in the seals located on the piston of the actuator rod. Consequently, only a partial cross sectional view of the seals of an actuator rod are illustrated in FIGURE 3.

The housing means is identified by reference numeral 91 and has a cylindrical bore 92 therethrough. The axis of bore 92 is identified by reference numeral 93. An actuator rod 94 is positioned within bore 92 of housing means 91 so as to move relative thereto along axis 93. Actuator rod 94 generally comprises an annular piston member 95, a first and a second hollow cylindrical piston rod 96 and 97, and means holding the piston rods on either side of the piston member. Piston member 95 is identical to piston member 48 and has a radial piston vent hole 98 therein. Piston rod 96 has a reduced diameter section 99 on one end thereof. A shoulder 101 is formed between the reduced diameter section 99 and the outer periphery of piston rod 96. An annular piston ring retainer 102 is positioned around reduced diameter section 99 of piston rod 96 abutting shoulder 101. A piston seal (O ring) 103 is positioned over reduced diameter section 99 adjacent to piston ring retainer 102. An annular piston ring separator 104 having an L-shaped cross section is positioned around reduced diameter section 99 of piston rod 96 adjacent piston seal 103. Piston ring separator 104 circumscribes the outer periphery of piston seal 103 and cooperates with piston ring retainer 102 so as to form a static seal.

A piston ring (O ring) 105 is positioned around the outer periphery of the piston ring separator 104 in substantially the same axial position as piston seal 103. Stated otherwise, piston seal 103 and piston ring 105 lie in a common plane perpendicular to axis 93. An annular backup ring 106 circumscribes piston ring separator 104 and is positioned adjacent to piston ring 105. Piston ring retainer 102, piston ring separator 104, piston ring 105, and backup ring 106 cooperate to form a dynamic seal between piston rod 96 and housing means 91. Piston rod 97 is identical to piston rod 96 and has an identical seal on one end thereof, which will not be described in detail.

Piston member 95 is positioned between the seals upon piston rods 96 and 97 and held in this position by means of a tie rod 107 so as to form actuator rod 94.

The operation of the hydraulic cylinder illustrated in FIGURE 3 operates in a like manner to the hydraulic cylinder illustrated in FIGURE 2, and need not be described in detail. In addition, the hydraulic cylinder illustrated in FIGURE 3 provides the same advantages as those discussed previously with reference to FIGURE 2.

While I have shown and described a specific embodiment of this invention, further modification and improvements will appear to those skilled in the art. I desire it to be understood, therefore, that this invention is not limited to the particular form shown, and I intend in the appended claims to cover all modifications which do not depart from the scope of this invention. What I claim is:

1. In a piston type fluid operated servomotor having an opening therethrough symmetrical with respect to an axis: an actuator rod assembly operable within said opening for axial movement, said actuator rod assembly comprising a large diameter piston member, two smaller diameter piston rods each having a yet smaller diameter at one end, each yet smaller diameter slidably receiving a dynamic seal thereon coacting with the opening, and means for securing in concentric relation the large diameter member to the smaller diameter piston rods with the two dynamic seals adjacent opposite sides of said member and in abutting relation thereto.

2. The apparatus of claim 1, each dynamic seal comprising: a backup ring, a resilient piston ring, and a piston ring retainer.

3. The apparatus of claim 2, wherein said member has an opening therein so that lesser axial fluid pressure is applied to the backup ring than to its associated piston ring retainer to thereby force the resilient ring against the backup ring.

4. In a piston type servomotor having a cylinder for receiving a linearly operable piston assembly, said assembly comprising: a large diameter member, a piston rod of smaller diameter than the member and having a short section of yet smaller diameter at one end thereof for receiving a dynamic seal by mere slidable action, and means securing said piston rod to the member with said seal adjacent said member with said seal coacting with said cylinder.

5. In a piston type servomotor having a cylinder for receiving a linearly operable piston, an end cap means for an end of said cylinder comprising: a cylindrically shaped end cap guide having a short section of reduced diameter received within said cylinder and the other section abutting the end of the cylinder, resilient ring circumscribing the other section, an end cap for the cylinder having an internal cylindrical cut-out portion whereby the resilient ring is contacted at four points by the cylinder, end cap guide means, and end cap, and means securing said end cap to said cylinder.

6. The apparatus of claim 5, wherein said end cap guide and said end cap have openings for slidably receiving a piston rod of said piston, said end cap having an internal reduced cylindrical portion, and dynamic sealing means engaged at four points, by the perphery of said piston rod, said internal reduced cylindrical portion, and an end of said end cap guide.

7. An actuator rod for a fluid operated servomotor comprising:
   a large diameter piston member having a central opening;
   a pair of piston ring retainers;
   a pair of sealing rings;
   a pair of back-up rings;
   a pair of piston rods each having a central opening and each having a small diameter portion at one end and a large diameter portion beyond, each small diameter portion slidably receiving in order a piston ring retainer adjacent the large diameter portion, a sealing ring, and a back-up ring; and
   means for securing said piston rods and piston member in axial alignment with said piston member intermediate said back-up rings whereby said actuator rod may be assembled by a stacking technique.

8. In a hydraulic motor including a housing having an opening therethrough symmetrical with respect to an axis and an actuator rod positioned within said opening and adapted for axial movement therein, said actuator rod comprising a large diameter piston member axially positioned between two piston rods, each rod having a first diameter smaller than the piston member and a second yet smaller diameter portion, said actuator rod having a dynamic seal slidably received on the second diameter portion of a piston rod which provides a seal between said housing and said piston member each dynamic seal including a piston ring retainer, resilient ring, and back-up ring with the two back-up rings adjacent said piston member.

9. In a piston type servomotor having a cylinder with an opening therethrough:
   an end cap means for an end of said cylinder and comprising an end cover, an end cap guide means, a large diameter resilient seal and a small diameter resilient seal, said end cover having a first large diameter cutaway portion or counter bore and a second smaller diameter cutaway portion or counter bore receiving the small diameter resilient seal, and the end cap guide means having a large diameter circumferential portion forming a seal facing for receiving the large diameter resilient seal and a smaller diameter portion received within said opening whereby said end cap means may be assembled on an end of said cylinder by means of a stacked technique.

10. In a piston type servomotor having a cylinder with an opening therethrough for receiving a linearly operable piston:
an end cap means attached to an end of said cylinder, said end cap means including an end cover having a cutaway portion or counter bore, and an end cap guide means having a large diameter circumferential portion forming a seal facing and a smaller diameter portion received within said cylinder opening whereby the end cap guide means is contacted on opposite sides by said end cover and said cylinder, the end cap guide means, said end cap cover, and cylinder being thereby assembled by means of a stacked technique and forming an annular cavity for receiving a resilient seal on said seal facing.

11. In a fluid operated piston type servomotor including a housing having an opening symmetrical with respect to an axis, in combination:
an end cap means for said housing including an end cover, an end cap guide means and a dynamic seal, said end cover having a circular cutaway portion or counter bore for receiving said dynamic seal and said end cap guide means having a circumferential portion received within said opening, said dynamic seal contacting said end cover, and an end of said end cap guide means.

References Cited by the Examiner
UNITED STATES PATENTS

| | | | |
|---|---|---|---|
| 2,574,299 | 11/51 | Sterrett | 91—166 |
| 2,728,620 | 12/55 | Krueger | 277—188 |
| 2,744,802 | 5/56 | Strayer | 92—166 X |
| 2,797,971 | 7/57 | Greenough | 277—188 |
| 3,044,785 | 7/62 | Geyer | 277—59 |
| 3,088,442 | 5/63 | Self | 92—768 X |

RICHARD B. WILKINSON, *Primary Examiner.*

KARL J. ALBRECHT, *Examiner.*